United States Patent [19]

Hench

[11] Patent Number: 5,080,962
[45] Date of Patent: Jan. 14, 1992

[54] METHOD FOR MAKING SILICA OPTICAL DEVICES AND DEVICES PRODUCED THEREBY

[75] Inventor: Larry L. Hench, Gainesville, Fla.

[73] Assignee: University of Florida, Gainesville, Fla.

[21] Appl. No.: 333,742

[22] Filed: Apr. 5, 1989

Related U.S. Application Data

[63] Continuation of Ser. No. 704,935, Feb. 25, 1985, abandoned.

[51] Int. Cl.⁵ .......................... B32B 7/02; B32B 9/04; C23F 1/00; H01L 21/306
[52] U.S. Cl. ..................................... 428/218; 156/648; 156/667; 427/53.1; 427/374.1; 427/376.2; 428/446; 385/130; 385/49
[58] Field of Search ................. 427/53.1, 374.1, 376.2; 428/210, 218, 446; 156/648, 667; 350/96.12, 96.21

[56] References Cited

U.S. PATENT DOCUMENTS

| | | | |
|---|---|---|---|
| 3,526,603 | 9/1970 | Acker | 502/405 |
| 3,878,034 | 4/1975 | Bever et al. | 428/446 X |
| 4,122,240 | 10/1978 | Banas et al. | 427/53.1 X |
| 4,140,548 | 2/1979 | Zimmer | 427/41 |
| 4,169,000 | 9/1979 | Riseman | 156/648 X |
| 4,286,024 | 8/1981 | Yoldas | 428/446 |
| 4,432,956 | 2/1984 | Zarzycki et al. | 501/12 X |
| 4,443,493 | 4/1984 | Delfino | 427/53.1 |

FOREIGN PATENT DOCUMENTS

0081031  5/1985  Japan ................................ 427/53.1

Primary Examiner—Richard D. Lovering
Attorney, Agent, or Firm—Finnegan, Henderson, Farabow, Garrett & Dunner

[57] ABSTRACT

An optical device made by treating, such as by a laser beam, a preselected portion of a silica gel monolithic body to obtain a density for the treated portion different from the density of the body.

21 Claims, 4 Drawing Sheets

METHOD FOR MAKING SILICA OPTICAL DEVICES AND DEVICES PRODUCED THEREBY

The invention described in this application was made with Government support under F49620-83-C-0072 awarded by the Air Force. The Government has certain rights in this invention.

This application is a continuation of U.S. application Ser. No. 704,935 filed Feb. 25, 1985 (now abandoned).

CROSS REFERENCES TO RELATED APPLICATIONS

This application is cross referenced to the following patents:

| U.S. Pat. No. | Issue Date | Inventors |
|---|---|---|
| 4,804,731 | February 14, 1989 | HENCH et al. |
| 4,849,378 | July 18, 1989 | HENCH et al. |
| 4,851,150 | July 25, 1989 | HENCH et al. |
| 4,851,373 | July 25, 1989 | HENCH et al. |
| 4,859,525 | August 22, 1989 | HENCH et al. |

BACKGROUND OF THE INVENTION

1. Field of the Invention

This invention relates to a novel method for making silica optical devices and more particularly such devices by means of sol-gel processing and creating therein thermally derived index gradients and to silica and silica gel optical devices as produced by the practice of the method.

2. Description of the Prior Art

Present methods of producing optical waveguides involve the use of chemical composition gradients induced either by chemical diffusion or ion exchange at the surface of a glass. Thermal fusion of dissimilar composition of glass can also be used. The chemical composition gradients result in a variation of index of refraction which can be used to guide optical signals. Any of these methods has inherent difficulties in controlling the shape of the index of refraction gradient. In addition, the presently used chemical methods for making wave guides have intrinsic limitations in the dimensions of the regions of differing index of refraction. A further disadvantage of chemical methods of inducing index gradients is that they cannot be used to produce internal, three-dimensional optical waveguides, i.e., present methods are restricted to production of planar or channel waveguides. Even further, the common use of alkali ion exchange to make waveguides in soda-lime-silica glass leads to an intrinsic mismatch of index of refraction of the waveguide to pure, vitreous silica fibers used in optical transmission systems.

Thus, there is great need for pure silica optical waveguides and optical components that are compatible with the index of refraction of optical transmission lines. Also, chemically induced index gradients suffer the possibility of compositional changes with time due to atmospheric attack or damage by imposed electromagnetic radiation. Waveguides carrying high intensity light can induce changes at the interface of the chemical composition gradients which result in a progressive increase in scattering and losses.

Furthermore, because of the refractory nature of pure $SiO_2$ it is very difficult to produce precise index gradients by chemical compositional diffusion. Consequently, it is exceedingly difficult to produce optical couplers, multiplexers, and other components in pure $SiO_2$ that can match the index of refraction of fiber optics transmission lines.

SUMMARY OF THE INVENTION

The present invention provides a process for manufacture of optical waveguides in pure $SiO_2$ using controlled localized densification of sol-gel derived $SiO_2$ matrices. By use of this method, complex optical waveguides and couplers can be made without resort to chemical diffusion, ion exchange, thermal fusion, or coating methods that produce index of refraction gradients by chemical means. Devices such as waveguides, couplers, gradient index planar mirrors and others can be made by the practice of the present invention.

DETAILED DESCRIPTION PREFERRED EMBODIMENTS

Optically transparent silica, for example, can be manufactured from metal organic compounds such as tetramethoxysilane (TMS) or tetraethoxysilane (TEOS) by means of hydrolysis and condensation polymerization steps. Processing of pure silica optical components using TMS with a drying control chemical additive (DCCA) are described in copending applications U.S. patent application Ser. Nos. 583,741; 583,742; and 583,744, filed Feb. 27, 1983, the first-mentioned application now being U.S. Pat. No. 4,851,150 and the latter two mentioned applications both now being abandoned, herein incorporated by reference.

PROCEDURE FOR SOL-GEL PROCESSING

Sol-Gel preparation and gel formation

For the purpose of obtaining reliable large scale, fully dried crack free silica monoliths an organic acid DCCA was used, such as oxalic acid, in a mixture of water and tetramethoxysilane (TMS) with the molar ratio about (0.01-0.40): (15-25): (1-1.5), respectively. The mixing of water with TMS forms a silica sol through hydrolysis and condensation polymerization reactions as is known.

The well mixed sol is cast from its heated vessel (25° C.-80° C.) into a mold in any shape that corresponds to the desired final optical component. The mold material is typically polyethylene, polystyrene or polytetrafluoroethylene. Gelation occurs in the well closed mold with the solid object that results taking the shape, configuration and surface finish of the mold. Gelation times are typically 2 minutes to 6 hours at 70° C.

The solidification gel inside the well closed vessel is placed into an aging oven at a preprogrammed temperature and time schedule ranging from 60° to 150° C. and from 1 to 15 hours. During the aging process, densification of the gel occurs without drying. This is an especially important step in the processing because the strength of the component is greatly increased without any danger of cracking. Thus a more rapid drying schedule of a few hours can be followed.

The aged gel is then subjected to drying under its own atmosphere. The pore liquid is removed by evaporation over a temperature range between 70° to 200° C. for a fixed time varying from 18 to 96 hours, depending upon size of the component.

The gels that possess an optimal ultrastructure and superior resistance to drying stresses are characterized nondestructively by observing the changes in visible optical scattering that occurs during drying. However the final dried components are optically transparent in the visible. Ultimately, the final state of drying is monitored by measuring weight loss. When the theoretical molecular weight of silica is reached, drying may be terminated. The surface area of the full dried silica monoliths prepared in this way ranges from 600 m²/g to 1100 m²/g.

The ultraporous dried silica gels are converted to partially dense or fully dense monolithic silica glasses by heating from 150° C. to 800° to 1300° C. over a period of time from 1 day to 3 days.

Figure 1:
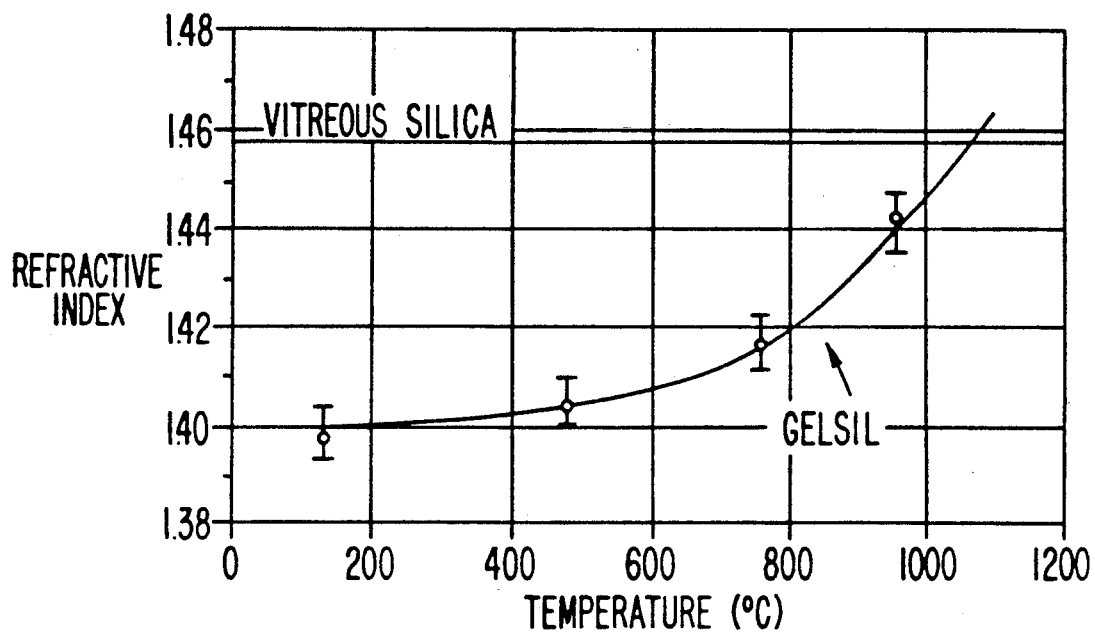
FIG. 1 is a graph of temperature plotted vs refractive index for heating dried silica gels to different temperatures.

As shown in FIG. 1, the index of refraction of the dried gel increases with the pyrolysis (densifying) temperature. The indices range from $n=1.397\pm0.004$ to $n=1.401\pm0.005$ for the low temperature fired silica gels (150°-450° C.) to $n=1.415\pm0.005$ to $1.439\pm0.004$ for the high temperature (750°-950° C.) fired silica gels. The index of refraction for pure fused silica is 1.457.

The principle of most accurate refractometers is based on the measurement of the critical angle $\phi_c$. In the development of the present invention a HeNe laser beam with wavelength equal to 0.6328 microns was used to measure $\phi_c$ of the interface between an unknown gel glass sample of index n and a prism of known index n'. Since n' is greater than n, the two must be interchanged in the standard equation, $\sin \phi_c = n/n'$. The beam is oriented such that some of the rays just graze the surface, so that the transmitted light has a sharp boundary between light and dark. Measurement of the angle at which this boundary occurs allows one to compute the value of $\phi_c$ and hence of n.

Figure 2:
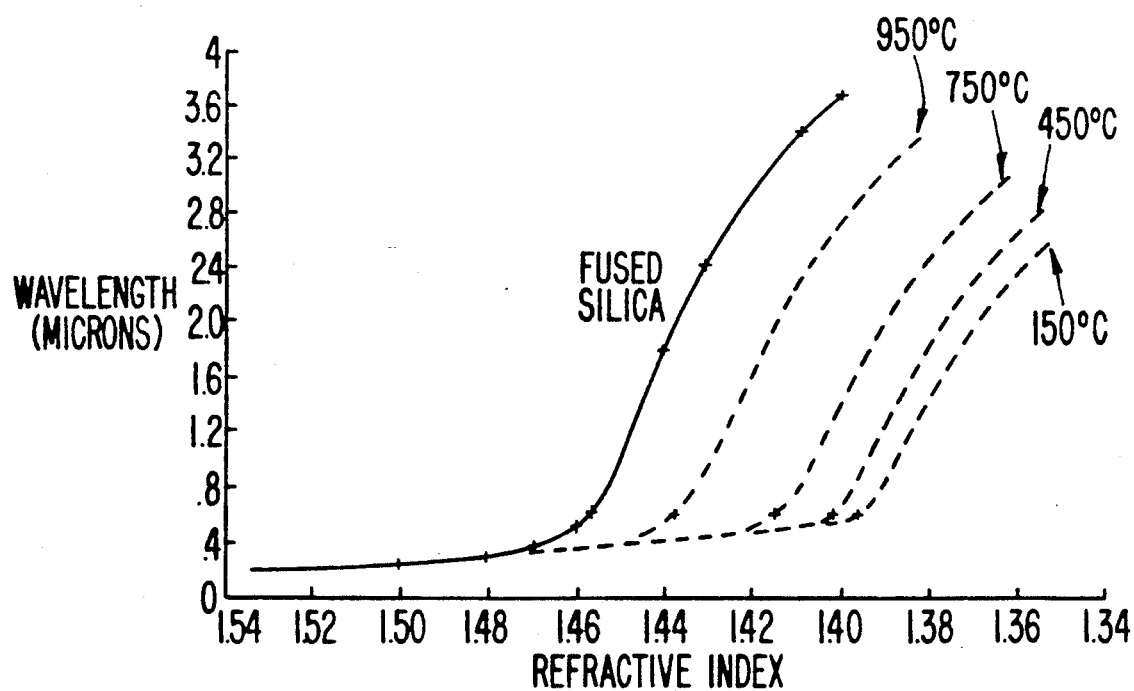
FIG. 2 is a graph of incident light wavelength vs refractive indices for fused silica and dried silica gels heated to different temperatures.

Sol-gel processing as described provides a unique method for preparing high grade optically transparent silica components with a range of physical properties heretofore unattainable. By varying the densification temperature it is possible to obtain an index of refraction (at $\lambda=0.6328$ microns) between 1.397 and 1.457. Hence, the gel derived silicas provide a family of optical components with properties not previously available from melt derived processes (see FIG. 2). With the exception of the lowest temperature samples (150° C.) this wide range of n is achieved without sacrifice of the IR absorption edge. For many optical applications the mechanical properties are quite acceptable, with strength ranging from 0.25 to 0.5 of vitreous silica, depending upon densification temperature. Increasing densification temperature to the range of 950°-1100° C. increases mechanical properties to 0.7-1.0 of vitreous silica, with an increase in density and n. Consequently, it is possible to select an optimal combination of index of refraction and mechanical properties for a particular optical system. For example, at 1.06 wavelength, large gel derived silica components with $n=1.41$ can be made with near net shapes and flexural and compressive strength equal to about 0.5 vitreous silica and microhardness values suitable for easy preparation of optical finishes.

The present invention also teaches that gradients in index of refraction can be achieved by imposing thermal gradients on a sample. Both positive and negative thermal gradients can be produced using focused laser beams, microwave heaters, convection ovens, and heat sinks. Consequently, positive and negative index gradients may also be achieved with the value of $\Delta n/\Delta x$ a function of $\Delta T/\Delta x$. Because of the non-linear dependence of $\Delta n/\Delta T$ shown in FIG. 1, it is possible to develop samples with very sharp spatial index gradients $\Delta n/\Delta x$). This invention teaches the first method of achieving a wide range of positive and negative index gradients without resort to compositional profiles. Consequently, by the present invention it is possible to avoid the potential chemical instability associated with compositional gradients by using thermally induced densification gradients.

Another inherent advantage of the non linear $\Delta n/\Delta T$ dependence of FIG. 1 is the possibility to produce spatial arrays of differing indices of refraction. Complex waveguide configurations can thereby be produced in pure silica without use of chemical diffusion and its associated complications.

Figure 3:
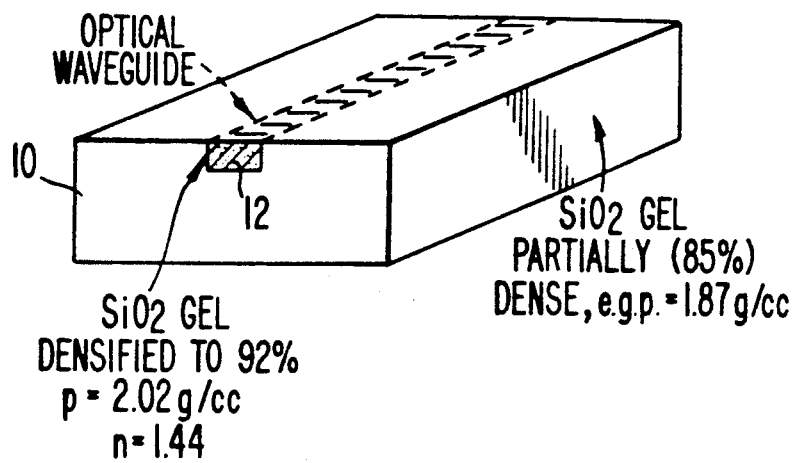
FIG. 3 is a schematic representation showing a monolith of silica gel containing an optical waveguide.

Referring now to FIG. 3 there is shown a silica gel monolith 10 partially densified to 85% of fused silica, e.g., density equal to 1.87 g/cc with $n=1.43$. Formed longitudinally in its top surface is a channel 12 of $SiO_2$ gel densified to 92% of fused silica, e.g., density equal to 2.02 g/cc with $n=1.44$. Channel 12 can serve as an optical waveguide.

Figure 4:
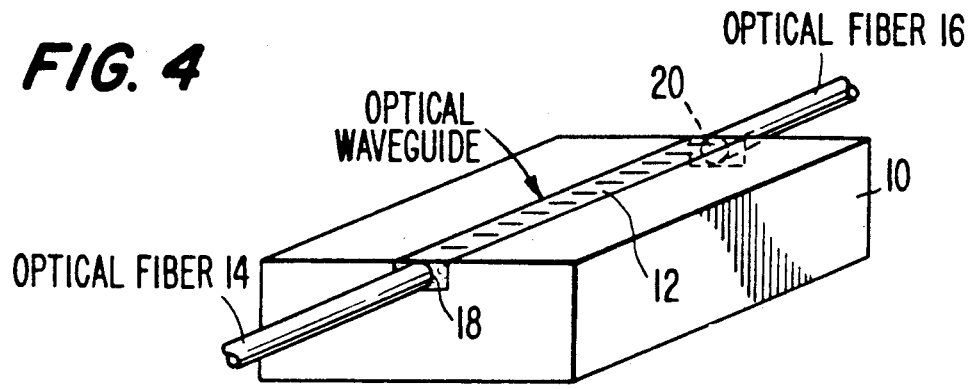
FIG. 4 is a schematic representation showing how the monolith of FIG. 3 is used as a coupler for two optical fibers.

In FIG. 4 the monolith 10 serves as a coupler for optical fibers 14 and 16 each of which is fused or otherwise optically connected at 18 and 20, respectively, to an end of channel 12.

Figure 5:
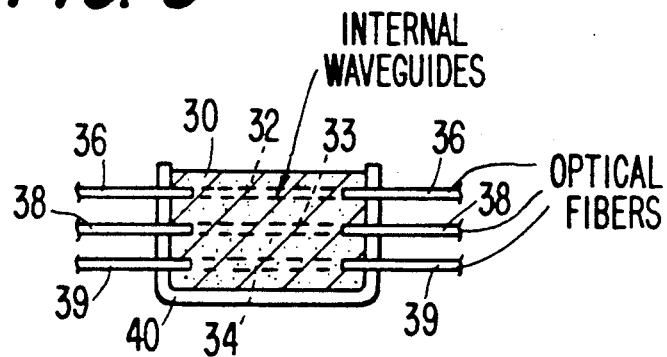
FIG. 5 is a schematic representation showing how a monolith of silica gel is used as a coupler for three sets of optical fibers.

In FIG. 5 a $SiO_2$ gel monolith 30 is established with a plurality of internal channels 32, 33 and 34 of a density different from monolith 30 and different from one another, if desired. The monolith 30 is mounted in a support 40 having holes aligned with the ends of the channels 32, 33, 34. Pairs of optical fibers 36, 38 and 39 project into the holes of support 40 and are fused or connected to the respective ends of respective channels. The channels 32, 33, 34 constitute internal waveguides and monolith 30 serves as a coupler for the pairs of optical fibers 36, 38 and 39.

Figure 6:
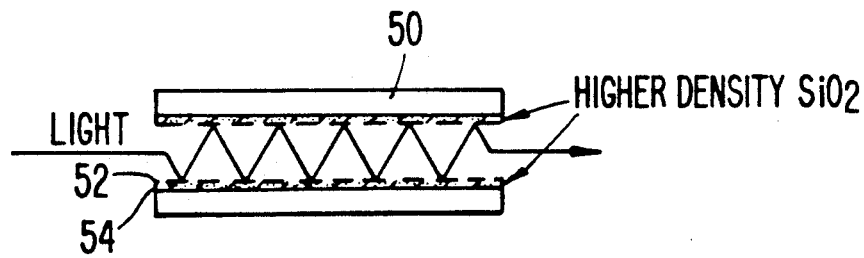
FIG. 6 is a schematic representation showing how a monolith of silica gel provided with a through hole can be used as a waveguide.

In FIG. 6, a $SiO_2$ gel monolith 50 of any shape, such as cubic, polyhedronal, or cylindrical, is provided with a through bore 52 which can be circular or rectangular in cross section. The surface of the bore, to a preselected depth or thickness is heat treated to obtain a layer 54 surrounding the bore of a density different from that of the monolith 50, i.e., a higher density. Bore 52 and/or layer 54 serve as a waveguide structure.

Figure 7:
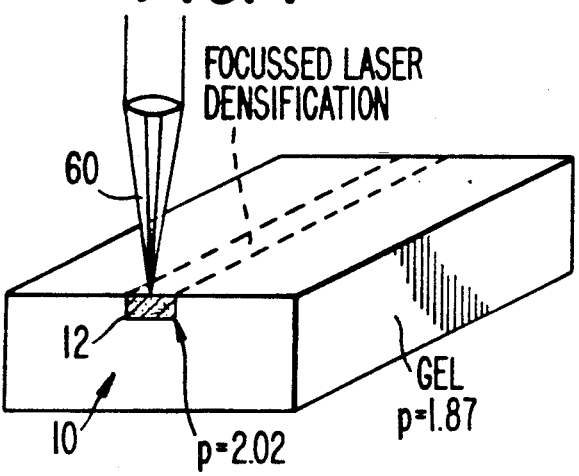
FIG. 7 is a schematic representation showing how a region of a silica gel monolith is densified.

In FIG. 7 there is shown a technique for obtaining the device of FIG. 3. A focused laser beam 60 is projected onto a narrow region of $SiO_2$ gel monolith 10 to heat the narrow region and densify relative to the body of monolith 10. The beam 60 is traversed, by any conventional means, longitudinally along the top surface of the monolith 10 from one edge or side to the other to create the further densified region or channel 12. As noted, the body 10 has a density of 1.87 g/cc while the channel 12 is heated by the laser bear: 60 and densified to 2.02 g/cc.

Figure 8:
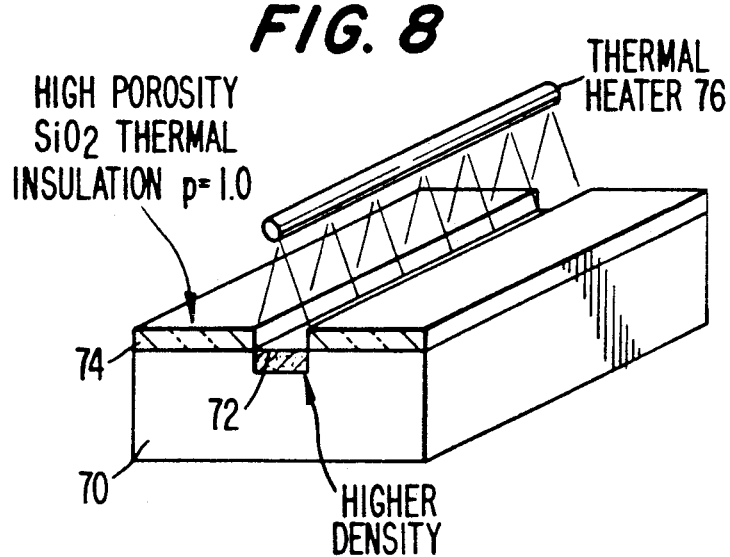
FIG. 8 is a schematic representation showing another technique for densification of a region of a silica gel monolith.

FIG. 8 shows a technique for masking the surface of a $SiO_2$ gel monolith 70 to create a channel 72 of higher density in its upper surface. A high porosity $SiO_2$ gel thermal insulating layer 74 is created on the surface of monolith 70. This can be done by holding the surface of monolith 70 on a heat sink that prevents the surface region from densifying to the same extent as the body of monolith 70 when it is heated to an elevated temperature. Thereby, layer 74 is created with a density of 1.0 g/cc, for example. Next layer 74 is masked with any HF acid resistant material, any known material can be used for this purpose such as polytetrafluoroethylene (PTFE), leaving exposed a longitudinally region corresponding and aligned over the channel 72 to be created. Then, HF acid is used to etch the exposed region of layer 74 to expose the main body 70. Thereafter, a thermal heater 76 is brought into proximity with the exposed region of body 70 to densify same to a degree greater than the density of body 70. As in the prior example, body 70 is densified to 1.87 q/cc and channel 72 is densified to 2.02 g/cc.

Figure 9:
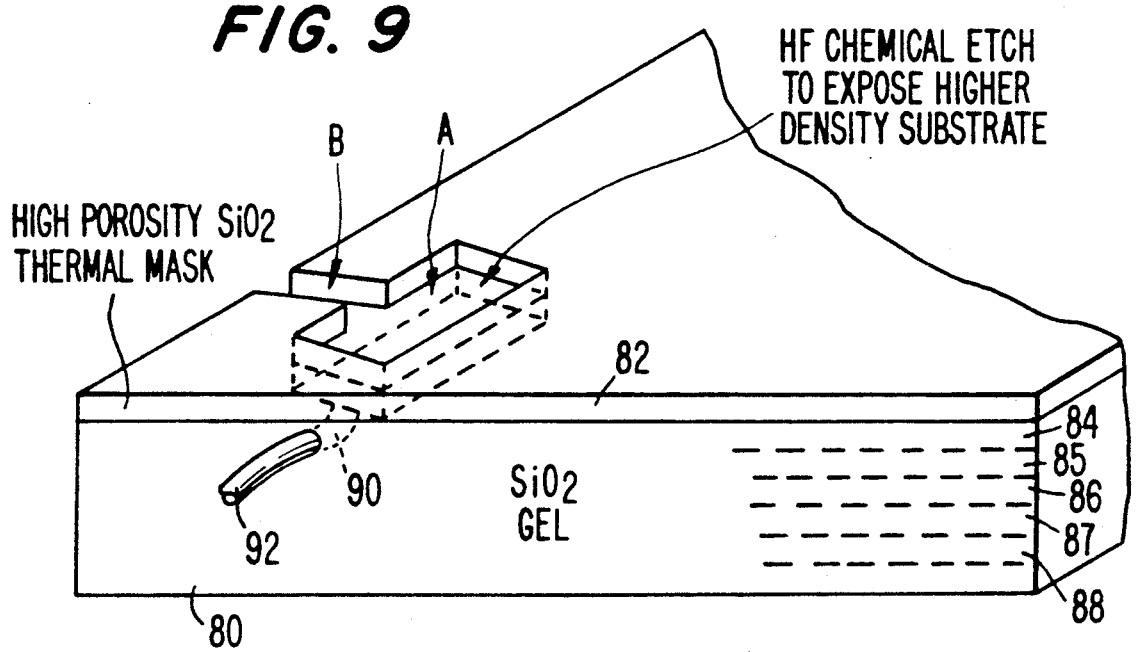
FIG. 9 is a schematic representation showing a technique for masking the surface of a silica gel monolith chip.

FIG. 9 illustrates how the principles of the present invention can be used to make multicomponent devices. A block or chip of $SiO_2$ gel 80 is made and partially densified using a thermal sink to create a high porosity $SiO_2$ gel thermal mask layer 82. Regions of the layer 82 are etched away using HF acid, as described with reference to FIG. 8, to leave regions of the higher density substrate exposed. See e.g. regions A and B. The exposed regions are treated by laser beams or thermally to increase their density relative to the surrounding substrate to create optical devices and optical pathways (conductors). Also, the substrate can be notionally divided into layers as indicated by the reference numbers 84, 85, 86, 87, 88 and dotted lines whereby devices can be formed in any notional layer and connections or conductors can be created both parallel to the faces 90, 92 of the substrate and normal to the faces 90, 92 to interconnect notional layers. Also, as shown, the region A of body 80 is brought out to the edge of the substrate by a treated and densified pathway 90 formed in notional layer 84. An optical fiber 92 is fused or otherwise connected to pathway 90.

Figure 10:
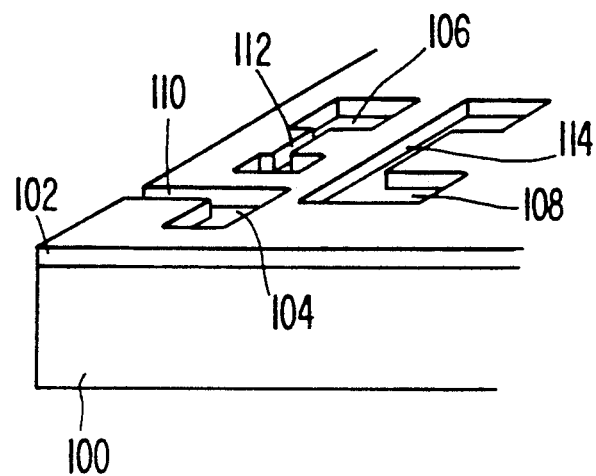
FIG. 10 is a schematic representation showing a silica gel monolith chip with a plurality of optical devices contained in the chips which are coupled through densified pathways formed in the chip.

FIG. 10 shows a substrate 100 of $SiO_2$ gel that has been treated in accordance with the teachings of the invention and has a high porosity thermal $SiO_2$ gel layer 102 on one face with optical devices 104, 106, 108 and conductors 110, 112, 114 formed in one face of substrate 100 in regions exposed through layer 102. Internal conductors for the optical devices are not shown but will be created as above described.

Figure 11:
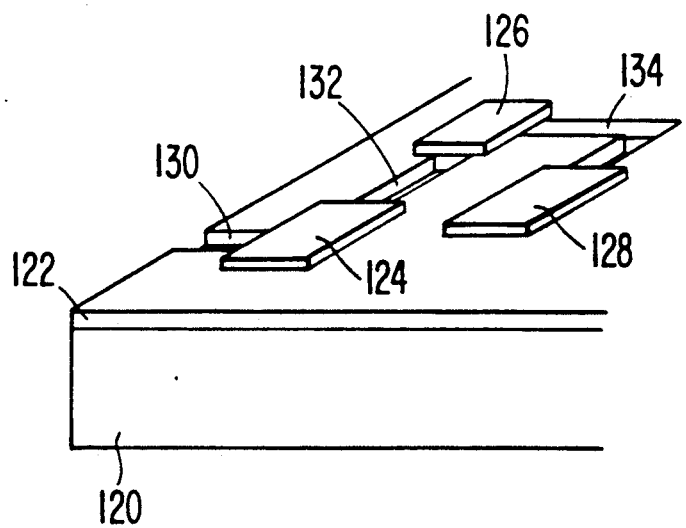
FIG. 11 is a schematic representation showing a silica gel monolith chip with a plurality of optical devices mounted on an insulating layer and wherein coupling paths are provided through the chip.

FIG. 11 shows a substrate 120 of $SiO_2$ gel with a thermal $SiO_2$ gel layer 122. In this form of the invention, the optical devices 124, 126, 128 are formed or mounted on the layer 122 and the substrate 120, by etching and densifying as aforesaid, provides, conduction paths 130, 132, 134 for the devices. Suitable connections are made between the devices and conduction paths by preparatory etching at appropriate locations underneath the devices.

In addition to the above, it is within the contemplation of the invention to build up a structure as follows. A substrate of $SiO_2$ gel is heat treated by a laser beam on one surface at discrete spaced areas to increase the density of the areas to create optical devices and conducting pathways as above described. Next, a layer of $SiO_2$ sol is coated over the surface using a polystyrene mold or dam and the sol gelled and aged as aforementioned to create a $SiO_2$ gel layer of density matching the substrate density. This new layer is then treated with a laser beam to densify areas connected to and above preselected areas on the surface of the substrate. Next, a second $SiO_2$ gel layer is created on the first, by the same technique, and again is treated by a laser to densify preselected areas to create devices and conducting pathways. In this way multilayers can be built up to obtain a three-dimensional integrated network.

Also it is possible to treat the surface of a $SiO_2$ substrate by an array, such as a linear array of laser beams with preselected spacing which traverse the surface from one edge to the opposite edge. A suitable control circuit is provided for the array to switch the beams on and off to densify preselected points, lines, or areas on the surface. A second array can sweep the surface normal to the first.

Having now fully described the invention, various changes and modifications will be apparent to one of ordinary skill in the art which do not depart from the spirit and scope of the invention as set forth herein.

What is claimed is:

1. A method of making an optically transparent optical device comprising hydrolyzing a silica precursor to form a silica sol, gelling said sol to form an optically transparent monolithic body and heating a first preselected portion of the body to increase its density, while a second preselected portion is maintained cooler than the body, to obtain a density for the heated portion greater than the density of the unheated portion of the body.

2. The method of claim 1 wherein the second preselected portion is held in contact with a cooling medium.

3. The method of claim 1 wherein the first preselected portion is exposed to a laser beam.

4. The method of claim 1 wherein the first preselected portion is exposed to radiant energy.

5. A method of making an optical device comprising making a silica monolithic body and treating a preselected portion of the body to obtain a density for the treated portion different from the density of the body wherein the body is heated to partially densify while maintaining a surface region of the body in contact with a cooling medium to create a thermal layer on said surface region, masking preselected areas of said thermal layer, etching away the thermal layer in the unmasked areas to expose areas of the partially densified body and heat treating the exposed areas of the partially densified body to increase the density of these areas.

6. An optical device made by the process of claim 5.

7. An optical device comprising a substrate of a silica gel monolith, a surface region of the substrate having a density lower than the main body of the substrate and another preselected region of the substrate having a density greater than the main body of the substrate.

8. An optical device as in claim 7 wherein one face is covered by a thermal layer of lower density silica gel with portions of higher density than that of the main body of the substrate exposed through said thermal layer.

9. An optical device as in claim 8 wherein optical devices are mounted on said thermal layer and connected conductively to said portions of higher density.

10. An optical device as in claim 7 wherein conducting pathways of higher density than that of the main body of the substrate extend through said substrate parallel to said one face.

11. An optical device as in claim 10 wherein the conducting pathways also extend with a component normal to said one face.

12. An optical device as in claim 7 wherein the substrate contains regions of higher density in notional layers within the substrate.

13. A method of making an optical device comprising hydrolyzing a $SiO_2$ precursor to form an $SiO_2$ sol, gelling said sol to form a substrate, treating one face of said substrate to densify preselected regions, hydrolyzing a silica precursor to form a $SiO_2$ gel layer on said treated face, and densifying preselected regions of said $SiO_2$ gel layer.

14. The method of claim 13 wherein at least one of said preselected regions of said layer is conductively connected to one of said preselected regions of said substrate.

15. The method of claim 14 wherein a second $SiO_2$ layer is formed on the first mentioned layer and preselected regions of said second layer are densified and at least one of said densified regions is conductively connected to one of, said preselected regions of said first mentioned layer.

16. An optical device made by the process of claim 13.

17. A method of making an optical device comprising hydrolyzing a $SiO_2$ precursor for form a $SiO_2$ sol, gelling said sol to form a substrate and treating one face of said substrate with an array of laser beams with preselected spacing to create preselected regions of increased density.

18. A method of claim 17 wherein the array is a linear array that traverses the substrate face from one side to the opposite side.

19. The method of claim 18 wherein the face of the substrate is further treated by a linear array of laser beams that traverses the substrate in a direction at an angle to the traverse of the first mentioned linear array.

20. The method of claim 17 wherein the linear array is controlled to create interconnected preselected regions of increased density.

21. An optical device made by the process of claim 17.

* * * * *